United States Patent Office 3,756,987
Patented Sept. 4, 1973

3,756,987
POLY(ETHYLENE TEREPHTHALATE) FROM ACYLOXYETHYL TEREPHTHALATES
Charles N. Winnick, Teaneck, N.J., asssignor to Halcon International, Inc.
No Drawing. Continuation-in-part of application Ser. No. 139,190, Apr. 30, 1971, which is a continuation-in-part of application Ser. No. 46,448, June 15, 1970, both now abandoned. This application Dec. 16, 1971, Ser. No. 208,933
Int. Cl. C08g 17/01
U.S. Cl. 260—75 R                                              32 Claims

ABSTRACT OF THE DISCLOSURE

Fiber and film-forming polyethylene terephthalate resins are prepared from bis-(beta-acyloxyethyl) terephthalates, mono-(beta-acyloxyethyl) terephthalates, or mixtures of bis-(beta-acyloxyethyl) terephthalates with mono-(beta-acyloxyethyl) terephthalates, the acyl group of which has from 1 to 4 carbon atoms, by a process comprising the steps of adding water to the terephthalate, or to the terephthalate mixture, heating the resulting aqueous mixture to liberate by hydrolysis from 25% to 100% of the acyl groups associated with the acyloxyethyl moiety of the terephthalate or terephthalates to form the corresponding bis-(beta-hydroxyethyl) terephthalate and/or mono-(beta-hydroxyethyl) terephthalate, and polymerizing the terephthalates contained in the hydrolyzate.

CROSS REFERENCE TO RELATED APPLICATIONS

This application is a continuation-in-part of co-pending application Ser. No. 139,190, filed Apr. 30, 1971 now abandoned, which in turn is a continuation-in-part of application Ser. No. 46,448, filed June 15, 1970 now abandoned.

Fiber or film-forming polyethylene terephthalate resins have found widespread commercial and consumer acceptance and consequently are now produced on an exceedingly large scale. To date, substantially all commercial production of these resins has proceeded via terephthalic acid by one of two routes. The first route involves the esterification of terephthalic acid with methanol to form dimethyl terephthalate which is then reacted with ethylene glycol by an ester exchange reaction to form bis-(beta-hydroxyethyl) telephthalate which is then polymerized.

The other widely practiced commercial route to these resin products also involves terephthalic acid but there the terephthalic acid is directly reacted with ethylene glycol to form the polymer, with bis-(beta-hydroxyethyl) terephthalate not being isolated although probably formed as an intermediate.

Both of these routes suffer from the same major drawback which is the necessity for the use of extremely pure terephthalic acid or dimethyl terephthalate in order to produce resin products of acceptable quality. Purification techniques for these materials, of course, exist but have proven to be very expensive largely due to the exceedingly poor solubility characteristics of terephthalic acid and the ex tremely low volatility of its dimethyl ester. These monomers have conventionally been purified by multiple high temperature recrystallization coupled with distillation under very high vacuum. These purification techniques have been deemed necessary even though they are notoriously expensive because it has heretofore been thought that only extremely pure monomeric components were suitable for manufacture of polyesters.

As a means of overcoming the aforesaid economic penalties, it has been proposed to convert terephthalic acid to a more readily processable raw material such as bis-(beta-acetoxyethyl) terephthalate and then to convert this acetoxyethyl diester of terephthalic acid directly to the polyester resin. (See British patent specification No. 760,-125.) Despite the superficial attractiveness of this route, it has not found commercial acceptance. Indeed, efforts to directly polymerize bis-(beta-acetoxyethyl) terephthalate have been successful only to the extent of producing polymers of little or no utility in preparation of fibers or films. (Note Control Examples B and C.)

While the art has long sought a technique permitting facile purification of the primary terephthalic acid raw material while, at the same time, enabling the straight forward production of high molecular weight fiber and film-forming resins, it has to date been unsuccessful.

SUMMARY OF THE INVENTION

It has been found that bis-(beta-acyloxyethyl) terephthalates and mono-(beta-hydroxyethyl) terephthalates and mixtures of bis- and mono-(beta-acyloxyethyl) terephthalates (which, for convenience, will be referred to as "mono-bis mixtures") are excellent raw materials for the production of polyester resins. These materials can, for example, be readily prepared from terephthalic acid and diesters of lower carboxylic acids with ethylene glycol, such as ethylene glycol diacetate and ethylene glycol diformate, as by heating. See applications Ser. No. 780,274 filed Nov. 29, 2968 (now abandoned), Ser. No. 41,653, filed May 28, 1970, Ser. No. 139,179, filed Apr. 30, 1971 (now abandoned), and Belgian Pat. 742,175. When co-produced carboxylic acid is not removed during the reaction the formation of mono-bis mixtures is favored, whereas removal of carboxylic acid leads to substantially exclusive formation of bis-(beta-acyloxyethyl) terephthalates. The terephthalic acid purity required to make the acyloxyethyl derivative is not high and the impurities normally present in terephthalic acid do not interfere with the reactions involved while these impurities can readily be removed from the acycloxyethyl ester once it is formed. Unlike terephthalic acid, dimethyl terephthalate or bis-(beta-hydroxyethyl) terephthalate, the bis-(beta-acycloxyethyl) terephthalates, the mono-(beta-acyloxyethyl) terephthalates, and the mono-bis-mixtures are comparatively easily processed.

This invention is founded on the discovery that bis-(beta-acyloxyethyl) terephthalates, mono-(beta-acyloxyethyl) terephthalates, and mono-bis mixtures can readily be converted to high molecular weight polyester resins suitable for fibers or films. In accordance with this invention, this conversion is accomplished by a series of process steps involving the hydrolysis of the mono- or bis-(beta-acyloxyethyl) terephthalate or the mono-bis mixture followed by the polymerization of the bis-(beta-hydroxyethyl) terephthalate, the mono-(beta-hydroxyethyl) terephthalate, or the mixture of bis-(beta-hydroxyethyl) terephthalate and mono-(beta-hydroxyethyl) terephthalate (hydrolyzed mono-bis mixture) contained in the hydrolyzate.

The hydrolysis is carried out by forming a mixture of (a) a material containing the mono-or bis-(beta-acyloxyethyl)terephthalate or the mono-bis mixture and (b) water. The admixture is then caused to react under the influence of heat to liberate it (i.e. hydrolyze) from 25% to 100% of the acyl moieties contained in the admixture as lower carboxylic acid. Mono- or bis(beta-hydroxyethyl) terephthalate or hydrolyzed mono-bis mixture contained in the hydrolyzate is then polymerized to a fiber or film-forming resin.

Superficially, the primary chemical reactions involved in the hydrolysis step of this invention appear to be in accordance with the following chemical equation wherein the lower carboxylic acid is assumed for convenience to be acetic acid:

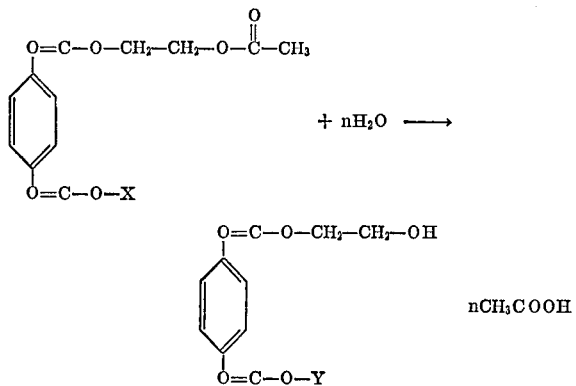

wherein $n=1$ or 2, X=H or

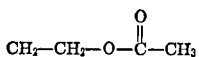

and Y=H or $CH_2$—$CH_2$—OH.

As the above equation indicates, in the hydrolysis the acetate moiety (or other acyl moiety) is liberated as acetic acid (or other like acid) and mono- or bis-(beta-hydroxyethyl) terephthalate or hydrolyzed mono-bis mixture, the monomers for the production of the polyethylene terephthalate polyester resins, are formed. Even on this basis, however, it is surprising to find that of the two types of ester linkages present in the organic raw material (i.e. aryl-alkyl and alkyl-alkyl linkages), the hydrolysis so predominantly favors liberation of the lower carboxylic acid rather than liberation of free terephthalic acid. This is especially so since, when terephthalic acid is liberated, it is so insoluble as to precipitate from the reaction medium and, as hydrolysis reactions are reversible, equilibrium considerations suggest that hydrolysis should preferentially occur so as to liberate free terephthalic acid, whereas it has been found that this reaction does not occur to an appreciable extent until most of the acyl moieties are liberated as the free lower carboxylic acid.

Moreover, the hydrolysis reactions are far more complex than the above equation indicates and the hydrolyzate, after removal of the lower carboxylic acid coproduct and any excess water present, generally contains a spectrum of materials in addition to the mono-(beta-hydroxyethyl) terephthalate and/or the bis-(beta-hydroxyethyl) terephthalate monomer. In the case where the acyloxy moiety is acetoxy, these other materials include ethylene glycol monoacetate, bis-(beta - hydroxyethyl) terephthalate-monoacetate, mono-(beta-acetoxyethyl) terephthalate, terephthalic acid and ethylene glycol. The last two of the aforementioned co-products are, of course, reaction products resulting from total hydrolysis, which to some extent does take place in the process of this invention; however, under preferred operating conditions these last two products are present in only minor amounts. In accordance with this invention, the hydrolyzate containing this broad spectrum of materials in addition to the mono- or bis-(beta-hydroxyethyl) terephthalate or the hydrolyzed mono-bis mixture is the material finally subjected to polymerization to form the resin product. In view of the prior art which indicates the necessity for an extremely pure monomer to obtain satisfactory polymer, it is quite surprising to find suitable polymers obtained from so complex a mixture.

DETAILED DESCRIPTION OF THE INVENTION

The process of this invention essentially involves a sequence of operating steps which are:

(1) Forming a mixture of (a) a diester consisting essentially of a bis-(beta-acyloxyethyl) terephthalate, a mono-(beta-acyloxyethyl) terephthalate, or a mono-bis mixture, the acyl group having from 1 to 4 carbon atoms, and which may also contain oligomers of bis - (beta-acyloxyethyl) terephthalate and/or mono-(beta-acyloxyethyl) terephthalate, and (b) water, and reacting them in such a manner as to partially hydrolyze the organic material to liberate from 25% to 100% of the acyloxy moieties as the corresponding carboxylic acid.

(2) Processing the hydrolyzate to remove therefrom the liberated acid and any excess water present.

(3) Polymerizing the balance of the hydrolyzate to form a resin product.

The organic raw material to the process of this invention is characterized as esters consisting essentially of a mono-(beta-acyloxyethyl) terephthalate, a bis-(beta-acyloxyethyl) terephthalate or a mono-bis mixture, and oligomers of one or more of these monomers may be present. Processes for the preparation of the acyloxyethyl derivative generally do not result in its production without the concurrent production of oligomers, from which the monomers can be separated, as by distillation, or which can remain in admixture with the monomers. These oligomers are materials having the formula:

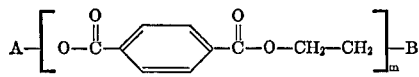

wherein "A" is H, HO—$CH_2$—$CH_2$, or

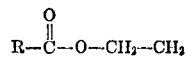

and wherein "B" is OH,

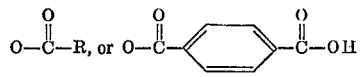

and where "R" is an alkyl radical having from 1 to 3 carbon atoms and where "m" is a number from 2 to 15, usually 2 to 10. The process of this invention contemplates the optional inclusion of such oligomers in the feed thereto, and thus the feed material consists essentially of the mono-(beta-acyloxyethyl) terephthalate, the bis-(beta-acyloxyethyl) terephthalate or of the mono-bis mixture and may contain oligomers of one or both of these materials, particularly the lower molecular weight oligomers, such as the dimers, which may be present even after distillation if a sharp separation is not effected.

The diester itself has the structural formula:

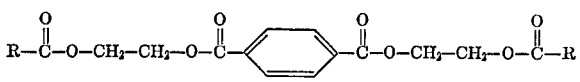

whereas the monoester has the formula

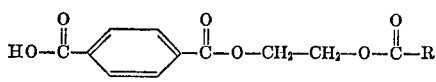

where "R" has the same meaning as that set forth in the preceding paragraph. Thus, suitable feeds to the process of this invention are bis-(beta-formoxyethyl) terephthalate, bis-(beta-acetoxyethyl) terephthalate, bis-(beta-propionoxyethyl) terephthalate, and bis-(beta-butyroxyethyl) terephthalate and the corresponding mono-(beta-acyloxyethyl) terephthalate, and mixtures of the bis- and mono-terephthalates. Mixtures of these bis-terephthalates or of the mono-terephthalates can also be employed as can inter-esters thereof such as beta-formoxyethyl-beta-acetoxyethyl-terephthalate. Of these esters, the preferred are bis-(beta-acetoxyethyl) terephthalate, mono-(beta-acetoxyethyl) terephthalate, and mixtures of the two, since acetic acid and its derivatives are relatively and widely available.

The mono-bis mixtures can, of course, be any mixture of mono-(beta-acyloxyethyl) terephthalate and bis-(beta-acyloxyethyl) terephthalate lying between 100% of the mono-compound and 100% of the bis-compound. Ordinarily, however, the mono-bis mixtures have a bis-(beta-acyloxyethyl) terephthalate content of at least 30 mol percent, i.e. the content of mono-(beta-acyloxyethyl) terephthalate would extend up to 70 mol percent. Most commonly, the bis-(beta-acyloxyethyl) terephthalate is the predominant component of the mono-bis mixture. The content of oligomers will depend upon the degree of separation to which the bis-(beta-acyloxyethyl) terephthalate and the mono-bis mixtures have been subjected by distillation and the feed may contain all of the terephthalates in monomeric form or some of the monomers may be present, as mentioned, as oligomers ranging from dimers up to polymeric chains containing as many as 15 segmers. Ordinarily, less than 50% of the terephthalates are present in oligomer form, preferably less than 25%. Small amounts of numerous coproducts, in sum up to about 40 mol percent of the total feed, generally up to about 5 mol percent, associated wtih the production of the bis-(beta-acyloxyethyl) terephthalate (the term "coproducts" is used to include by-products of the reaction, unreacted reagents, and like components of the product of the reaction) can also be present in the feed. The use of feeds containing such amounts of coproducts is also contemplated within the scope of this invention. Such coproducts include ethylene glycol, ethylene glycol mono-acylate (e.g. the mono-acetate) ethylene glycol diacylate (e.g. the di-acetate), terephthalic acid, mono-(beta-hydroxyethyl) terephthalate, bis-(beta-hydroxyethyl) terephthalate, and bis-(beta-hydroxyethyl) terephthalate-monoacylate.

For convenience, the organic feed material consisting essentially of the bis-(beta-acyloxyethyl) terephthalate, the mono-(beta-acyloxyethyl) terephthalate, or the mono-bis mixture, and which may also contain corresponding oligomers will frequently hereinafter be referred to as the "ester feed."

The co-reactant is, of course, water. The amount of water employed is at least sufficient to provide 0.25 mol per equivalent of the acyloxy moiety contained in the ester feed. Desirably, at least 0.35 mol of water is employed per equivalent of the acyloxy moiety in the ester feed, and preferably at least 0.5 mol of water is used per equivalent of the acyloxy moiety in the ester feed. The upper limit on the amount of water employed as co-reactant is dependent on two factors, the first of which is simply one of economics since excess water is removed prior to or during polymerization and presumably liberated carboxylic acid would be separated from water for further use or sale. Secondarily, however, increasing the ratio of water to acyloxy moiety in the ester feed also tends to increase the amount of total hydrolysis which occurs, (i.e. increases the amount of terephthalic acid and ethylene glycol liberated). While such total hydrolysis does not affect the operativeness of the process of this invention, it does present otherwise unnecesarry solids-handling problems. Accordingly, normally less than 50 mols of water per acyloxy moiety in the ester feed would be employed, desirably less than about 30 mols of water per equivalent of the acyloxy moiety; and preferably less than about 20 mols of water per equivalent of the moiety are used. An especially preferred operation employs from about 0.5 to about 20 mols of water per equivalent of acyloxy moiety in the esters, although as pointed out above, much broader ratios are quite operative and are hereinafter exemplified.

Other significant hydrolysis reaction conditions are temperature and time of reaction and these are directed to obtaining the desired extent of hydrolysis. The liberation of at least 25% of the acyl moieties as the corresponding acid is necessary to achieve satisfactory high molecular weight fiber or film-forming polyester resins. Desirably at least 35% of the acyl moieties are liberated and preferably at least 50% of the acyl moieties are liberated during the hydrolysis. There is, of course, no essential upper limit on the extent of hydrolysis and it is quite practicable to operate in such fashion as to liberate close to 100% of the acyl moieties as the free acid. However, as hydrolysis approaches total liberation of the acryl moieties as the acid, increasing amounts of free terephthalic acid are also liberated and, if hydrolysis is permitted to proceed, significant amounts of solids may be formed which could present operating difficulties. Hence, to provide flexibility of operation, it is desired to limit the hydrolysis so that only up to about 95% of the acyl moieties are liberated and it is preferred to limit the hydrolysis so that only up to about 85% to 95% of the acyl moieties are liberated. The extent of hydrolysis is readily monitored by analysis of representative samples of the total hydrolyzate to determine, for example by titration of a distillate fraction thereof, the amount of volatile acids contained therein; such volatile acids can be deemed to be entirely the lower carboxylic acid without introducing any significant error.

Hydrolysis reaction temperatures of at least about 130° C. are necessary in order to obtain satisfactory rates of hydrolysis except that when catalysts (discussed subsequently) are employed, temperatures as low as 100° C. can be used. It is generally not desired to employ hydrolysis reaction temperatures above about 275° C. since at higher temperatures thermal degradation, with concomitant formation of color bodies, can become significant. The hydrolysis is desirably conducted at temperatures between about 130° C. and about 240° C. and preferably at temperatures between about 130° C. and 220° C.

Pressure is not, in any manner, critical to the conduct of the hydrolysis so long as it is sufficient to maintain a liquid phase. Thus pressures of as little as 1 to 2 p.s.i.a. can be employed as also can pressures of several thousand p.s.i.a. Economy of equipment construction is the only criteria of significance in choice of pressure and this suggests that optimum pressures between about 5 p.s.i.a. and about 5000 p.s.i.a., desirably between about 12 p.s.i.a. and about 1000 p.s.i.a. and preferably between about atmospheric pressure and about 500 p.s.i.a.

Having set forth the extent of the hydrolysis reaction and the reaction temperatures, the reaction times cannot be independently specified; reaction time is dependent upon the factors already discussed. Generally, however, reaction times consistent with obtaining the above-mentioned extent of hydrolysis and at the temperatures set forth would be between about 1 minute and 32 hours and more commonly between about 15 minutes and 4 hours. In general, it is desired that the hydrolysis reaction be terminated as quickly as possible after the desired extent of hydrolysis is obtained to minimize liberation of significant quantities of insoluble terephthalic acid. Typically, therefore, the hydrolysis reaction would be terminated within 1 hour when the hydrolysis reaction temperature is 200° C., and within 4 hours when the hydrolysis reaction temperature is 140° C.

The hydrolysis reaction is readily terminated by rapidly cooling (i.e. quenching) the hydrolyzate to a temperature of about 100° C. or below, e.g. by adding water or by indirect heat exchange.

The hydrolysis reaction can be conducted non-catalytically and it is normally preferred to conduct it in this fashion. However, catalysts can be employed and can reduce the time required to accomplish hydrolysis. Suitable catalysts are the Bronsted acids, and these may be organic or mineral acids. Suitable organic catalysts for the conduct of this reaction are such materials as the aryl sulfonic acids, such as benzene sulfonic acid, naphthalene sulfonic acid and the lower-alkyl substituted homologs of these acids. The aryl phosphonic acids can also be used as also can such materials as trichloracetic acid. Suitable inorganic acid catalysts for the conduct of this reaction include such materials as sulphuric acid, phosphoric acid, the halogen acids and even such weakly acidic materials as boric acid and silicic acid. Acid volatility is not generally a factor of importance in the conduct of the hydrolysis reactions; thus it is as feasible to employ such volatile acids as HCl and HBr as it is to employ such non-volatile acids as the benzene sulfonic acids or sulphuric acid except when the reaction system employed is such as to permit removal of liberated lower carboxylic acid concurrently with the conduct of the hydrolysis reaction; in this specific case the non-volatile acid catalysts would be preferred.

When catalysts are used, suitable concentrations are between about 0.001 wt. percent and about 5.0 wt. percent, desirably between about 0.001 wt. percent and about 1 wt. percent and preferably less than about 0.05 wt. percent. These weight percentages are based upon the ester feed to the hydrolysis and not on the total feed which includes water.

The hydrolysis reaction of this invention can be conducted either with or without the presence of extraneous solvents. Suitable solvents are polar materials such as lower aliphatic ethers, the lower aliphatic carboxylic acids, esters such as ethylene glycol diacetate, the aliphatic alcohols and aliphatic glycols. It is normally preferred not to employ solvents in the conduct of the hydrolysis reaction unless the extent of the hydrolysis is such that substantial amounts of terephthalic acid will be liberated during the hydrolysis. One especially preferred solvent, normally indigenous to polyester resin formation, is ethylene glycol, and it is normally preferred that, if a solvent is to be used, it be this material, especially when the ester feed consists essentially of mono-(beta-acyloxyethyl) terephthalate or of a mono-bis mixture containing over 70 mol percent mono-(beta-acyloxyethyl) terephthalate. Another preferred solvent is an aqueous solution of the lower carboxylic acid liberated in the hydrolysis, e.g. acetic acid, formic acid, etc. Whenever a solvent other than ethylene glycol is to be employed, it is preferred to choose one which has a volatility intermediate between that of acetic acid and ethylene glycol, so that the solvent can readily be removed when its presence is no longer desirable.

The hydrolysis is conducted in the liquid phase and may be carried out either batch-wise or continuously. Similarly, in either batch or continuous operation, either one or a plurality of stages can be employed. The hydrolysis can be conducted in a plurality of autoclave type reactors connected in series, with the water being fed to the first stage, to each of the stages, or to any combination. Tower type reactors (including rotating disc contractors) can also be used and in some circumstances can be advantageous in giving the effect of a plurality of reaction stages within a single vessel. When a plurality of stages is employed, it is preferred to use co-current flow of the two reactants rather than counter-current flow since this minimizes the amount of total hydrolysis occurring and thereby minimizes solids-handling problems. In batch operation, employment of more than one stage possesses little advantage; however, in continuous operation, multi-stage operation is preferred. Any number of reaction stages can be used, the maximum again being governed solely by economics. Equipment having from 1 to 12 stages, desirably 1 to 8 and preferably from 1 to 6 stages are representative of that which would be employed in continuous operation.

Tower-type reactors employing co-current flow are especially advantageous for continuous operation, since, in this type of reactor, an inert gas can be introduced flowing counter-currently to the flow of the reactants. The inert gas thus can function to strip out at least a portion of the co-product lower carboxylic acid and some of the excess water normally present in hydrolysis concurrently with the conduct of the hydrolysis. Conduct of the hydrolysis reaction in this fashion minimizes, and can even eliminate, the necessity for subsequent removal of these materials, i.e. the removal still occurs but occurs simultaneously with the hydrolysis. Inert gases suitable for conduct of this embodiment of the invention include nitrogen, helium, neon, argon, hydrogen (less preferred because of flammability), and the normally gaseous lower alkyl and mono-olefinic hydrocarbons such as methane, ethane, propane, ethylene, propylene, the butanes and the butylenes.

Once the hydrolysis reaction has been completed, the liberated lower carboxylic acid and any excess water present are removed. This can readily be accomplished by conventional distillation techniques in conventional distillation equipment. Such equipment would process the total hydrolyzate at temperatures between 70° C. and about 250° C. at pressures between about 5 mm. Hg and about 150 p.s.i.g. and would contain from 1 to 50 theoretical vapor-liquid contacting states. Alternatively, and/or additionally, the removal of lower carboxylic acid and any excess water present can be carried out concurrently with the polymerization of the bis-(beta-hydroxyethyl) terephthalate in the hydrolyzate. Design of equipment to accomplish the removal of liberated acid and excess water is entirely conventional and would remove water and lower carboxylic acid as an overhead while preferably leaving behind in the hydrolyzate ethylene glycol formed during the hydrolysis reaction as well as its monoester with the carboxylic acid (e.g. ethylene glycol monoacetate). That is, in the design of such equipment, acetic acid would be in the "light key" while ethylene glycol would be in the "heavy key." Alternatively and equally practicable, acetic acid would be the light key and the ethylene glycol monoester would be the heavy key. It will be apparent that such removal presents a few practical difficulties.

Generally, a separate processing step wherein the liberated lower carboxylic acid and excess water are removed would be employed and, in this step, over 90% of the lower carboxylic acid liberated, preferably over 95% of this acid would be removed during this concentration step. Excess water, if present, would also be removed in this step and being more volatile than acetic acid would be removed to an event greater extent.

The hydrolyzate containing bis-(beta-hydroxyethyl) terephthalate, mono-(beta-hydroxyethyl) terephthalate, or hydrolyzed mono-bis mixture is then the material which, in accordance with this invention, is polymerized to the polyester resin. When the ester feed consists essentially of mono-(beta-acyloxyethyl) terephthalate or of a mono-bis mixture containing more than about 70 mol percent of mono-(beta-acyloxyethyl) terephthalate, it is desirable that the hydrolyzed product subjected to polymerization should contain ethylene glycol. The amount of ethylene glycol depends on the mono-bis ratio and should be sufficient to provide a total of at least 1.1 mols of ethylene glycol moieties (including the ethylene glycol moieties present in the hydrolyzed terephthalate product, i.e. the ethylene glycol moieties contained in the ester groups of the terephthalates) per mol of equivalent terephthalic acid, i.e. terephthalic acid moieties, contained in the hydrolyzate, preferably 1.2 mols, and desirably 1.3 mols. By "equivalent terephthalic acid contained in the hydrolyzate" is meant not only free terephthalic acid but its equivalent in whatever form present therein, e.g. as terephthalate. Levels higher than 1.3 mols of ethylene glycol moieties per mol of equivalent terephthalic acid can be employed and the upper limit is governed only by economic considerations. In a typical case the amount of ethylene glycol would range up to about 5 mols per mol of equivalent terephthalic acid. The ethylene glycol may be added, as mentioned, as a solvent for the hydrolysis reaction, or if no solvent is used, it may be added prior to polymerization. The polymerization is carried out in the conventional manner normally employed for the polymerization of bis-(beta-hydroxyethyl) terephthalate. The final polymerization requires the presence of a catalyst. Suitable catalysts include compounds such as the oxides, carbonates, sulfides, hydroxides or the like of antimony, zinc, calcium, cerium, cadmium, lead, lithium, zirconium, aluminium, tin, titanium, and cobalt. Such catalysts are conventionally employed in amounts sufficient to provide from $5 \times 10^{-6}$ to about $5 \times 10^{-2}$ mol of metal per mol of equivalent terephthalic acid contained in the hydrolyzate. The polymerization itself requires heating under vacuum for example at a temperature between 220° C. and about 325° C. at a pressure from about 0.05 mm. Hg to about 20 mm. Hg until ethylene glycol liberation ceases. This normally will require between about 20 minutes and about 6 hours. It should be noted that the material liberated during the polymerization contains not only ethylene glycol but also derivatives of the lower carboxylic acid corresponding to the acyl moiety of the diester feed. The predominant derivative liberated in addition to ethylene glycol seems to be the monoester of ethylene glycol with the acid, e.g. ethylene glycol monoacetate. From 2% to as much as 30% or even more of the ethylene glycol liberated during polymerization can be liberated in the form of such derivatives.

The final polymer product produced is generally in the form of a white solid with a melting point above about 240° C. and with intrinsic viscosities greater than about 0.60 as determined in 60% phenol, 40% symmetrical tetrachloroethane (weight basis) solutions at 30° C.

The following examples are presented to further illustrate this invention but are not intended as limiting the scope thereof. Unless otherwise stated, all parts and percents in the following examples are on a molar basis.

EXAMPLE I

An admixture is prepared by adding a diester consisting essentially of bis-(beta-acetoxyethyl) terephthalate and its oligomers (450 parts by weight) to 990 parts by weight water. This corresponds to a molar ratio of water to acetate moiety of 27.5:1. The diester used in this example is prepared by reaction between terephthalic acid and ethylene glycol diacetate and contains approximately 65% monomer and 35% oligomer (molar basis, calculated on equivalents of terephthalic acid) with the average degree of polymerization of the oligomer being 2.5 to 3.0 (i.e. "$m$" in the structural formula of column 4 is 2.5 to 3.0). This admixture is charged to an autoclave equipped with heating coils and a turbine-type agitator. The autoclave is then pressured with nitrogen and heated to 200° C., the reactor pressure after heating being 200 p.s.i.g. During the conduct of the reaction, samples are periodically withdrawn, distilled, and the distillate analyzed for contained acid. After one hour, analysis indicates that about 95% of the acetate moieties have been liberated as acetic acid and the reaction is then quenched by adding cold water to the autoclave to cool its content to approximately 100° C. The water added in this manner serves also as a rinse to ensure maximum product recovery.

The autoclave is then depressured and the contents thereof are stripped with nitrogen under vacuum (pot temperature of 70° C. and pressure of 0.1 mm. Hg at the end point of the stripping operation) to remove excess water and acetic acid liberated during the hydrolysis. The hydrolyzate remaining in the autoclave after cooling is in the form of a dry powdery solid. This solid is then admixed with 0.02% by weight of antimony trioxide to act as a polymerization catalyst and this admixture is then charged to a second autoclave where it is heated to the melting point of the hydrolyzate (ca. 90° C.). After the hydrolyzate is melted, nitrogen is bubbled through the melt and the temperature is quickly raised to 280° C. Vigorous evolution of ethylene glycol, containing some ethylene glycol monoacetate, from the melt is observed to take place, and this ethylene glycol is stripped out and taken overhead. Pressure during this initial phase of the polymerization is atmospheric. After one hour, pressure on the autoclave is reduced over a 30 minute period to 0.1 mm. Hg while still maintaining temperature at 280° C. Heating under vacuum is continued for an additional 2.5 hours during which time additional ethylene glycol and ethylene glycol monoacetate is taken overhead. At the end of this period, the contents of the autoclave are cooled and analyzed. The product is found to be polyethylene terephthalate, white in color, having a melting point of 258° C. and an intrinsic viscosity of 0.70. Substantially similar polymer quality is obtained when this example is repeated except that acetic acid and water are not removed prior to polymerization but are removed concurrently with ethylene glycol and ethylene glycol monoacetate during polymerization.

EXAMPLE II

The procedure of Example I is repeated, employing a feed admixture containing sufficient water to provide a molar ratio of water to acetate moiety of 4:1. The hydrolysis is conducted for one hour prior to quenching and it is found that 65% of the acetate moieties in the diester feed have been liberated as acetic acid. After stripping of the liberated acetic acid from the hydrolyzate, the balance of the hydrolyzate is noted to be in the form of amorphous, somewhat glassy, solid which is then polymerized employing the procedure of Example I. The polymer obtained is identical in appearance to the polymer of Example I and has a melting point of 256° C. and an intrinsic viscosity of 0.67.

EXAMPLE III

Example II is repeated with a diester feed containing 85% monomer and 15% oligomer (the average degree of polymerization of the oligomer being 2.4 to 2.6). Results obtained are substantially identical with those of Example I.

EXAMPLE IV

The procedure of Example I is repeated employing an organic feed which has been vacuum-distilled to provide a material having a bis-(beta-acetoxyethyl) terephthalate content of 98% and only 2% of oligomers. Polymer quality obtained is substantially similar to that of Example I.

EXAMPLE V

The procedure of Example IV is repeated employing, as the diester, the following materials:

bis-(beta-formoxyethyl) terephthalate,
bis-(beta-propionoxyethyl) terephthalate,
bis-(beta-butyroxyethyl) terephthalate and
bis-(beta-isobutyroxyethyl) terephthalate.

In each case, polymers substantially similar to those of Example I are obtained.

EXAMPLE VI

A series of runs are carried out with the diester feedstock of Example I at a temperature of 200° C. to illustrate the effect of varying water to equivalent acyl moiety in the conduct of the hydrolysis. In these runs, reaction time is varied where necessary to prevent significant amounts of total hydrolysis. The following table illustrates results obtained:

| Run number | Mols H₂O per equivalent acetate moiety | Time, hours | Percent of— Acid | Percent of— TA formed |
|---|---|---|---|---|
| 1 | 0.5 | 3.0 | 20 | 2-3 |
| 2 | 2.0 | 1.4 | 45 | 3-6 |
| 3 | 4.0 | 1.0 | 65 | 3-6 |
| 4 | 5.0 | 0.9 | 74 | 3-6 |
| 5 | 7.5 | 0.7 | 83 | 3-6 |
| 6 | 12.5 | 0.5 | 92 | 2-4 |
| 7 | 25 | 0.25 | 97 | 2-4 |
| 8 | 50 | 0.1 | +99 | 0-2 |
| 9 | 100 | 0.1 | +99 | 0-2 |

In the above table, the term "Percent Acid" refers to the percent of the acetate moieties liberated as acetic acid during the hydrolysis and the term "Percent TA" refers to the percentage of the diester which is converted to free terephthalic acid. These terms are also used in subsequent tables, and, when used have the same meaning.

EXAMPLE VII

A series of hydrolysis runs are conducted at a temperature of 180° C. to illustrate the effect of the proportion of acetate moieties liberated as acetic acid upon polymer quality. The procedure employed is that of Example I. Runs identied by letters ("A," "B," etc.) are controls and are not illustrative of this invention.

| Run number | Percent of— Acid | Percent of— TA | Polyester product Melting point, °C. | Intrinsic viscosity |
|---|---|---|---|---|
| A | 20 | 2-3 | 250-251 | 0.18 |
| 1 | 45 | 3-6 | 256-257 | 0.62 |
| 2 | 65 | 3-6 | 257-258 | 0.69 |
| 3 | 74 | 3-6 | 257-258 | 0.71 |
| 4 | 83 | 3-6 | 257-258 | 0.72 |
| 5 | 92 | 2-4 | 257-258 | 0.69 |
| 6 | 97 | 2-4 | 257-258 | 0.72 |
| 7 | +99 | 0-2 | 257-258 | 0.73 |
| 8 | +99 | 25 | 257-258 | 0.73 |
| 9 | +99 | 70 | 257-258 | 0.70 |
| B | 0 | 0 | 245-247 | 0.12 |
| C | 0 | 0 | 248-249 | 0.16 |
| D | 5 | 0 | 246-248 | 0.18 |

Runs 7 to 9 of the above table illustrate that the process of this invention provides satisfactory polymers even when conditions are chosen to provide substantial amounts of total hydrolysis although such operations are not preferred because of the substantial amounts of solids present. A comparison of the results of Runs 1 to 5 with those of Controls A and D illustrates the importance of liberating at least about 25% of the acetate moieties during hydrolysis. Control B illustrates that suitable fiber or film-forming polyesters are not obtained when unhydrolyzed bis-(beta-acetoxyethyl) terephthalate is polymerized by the procedure used in Example I. Control C is illustrative of an attempt to polymerize unhydrolyzed bis-(beta-acetoxyethyl) terephthalate at more severe conditions (305° C. for 6 hours at a pressure of 1 mm. Hg) and, here too, the polymer's melting point and intrinsic viscosity are both too low for use in fibers or films. When Controls B and C are repeated, employing different catalyst concentrations (both lower and higher), polymer quality varies slightly but, in all cases, intrinsic viscosity and melting point remain too low for use of the resultant polymer in fibers or films.

EXAMPLE VIII

A series of polymerizations are conducted employing the hydrolyzate of Example I from which excess water and acetic acid have been removed, but employing, instead of antimony trioxide, various other conventional polymerization catalysts, including the oxides of zinc, calcium, cerium, cadmium, lithium, and aluminum, the carbonates of antimony, titarium, lithium and zinc, the sulfides of aluminum, antimony lead and cadmium as well as the hydroxides of antimony calcium lithium and zirconium. Polymer quality in each case is similar to that of Examples I and II. This example demonstrates that the process of this invention is employable with any of the conventional polyester polymerization catalysts.

EXAMPLE IX

A series of runs are carried out using the procedure and apparatus of Example I with a water to equivalents of acyl moiety ratio of 10:1 but at varying temperatures. In each case, attempts are made to terminate (i.e. quench) the hydrolysis after 85% of the acetate modieties are liberated as acetic acid but not with complete success in all runs. The following table summarizes the results:

| Run number | Temperature, °C. | Percent of— Acid | Percent of— TA | Time, hours | Polyester product Melting point, °C. | Intrinsic viscosity |
|---|---|---|---|---|---|---|
| 1 | 130 | 75 | 30 | 16 | 256-7 | 0.66 |
| 2 | 160 | 82 | 30 | 12 | 256-7 | 0.64 |
| 3* | 150 | 83 | 3-6 | 1 | 258-9 | 0.70 |
| 4 | 180 | 87 | 3-6 | 3 | 258-9 | 0.72 |
| 5 | 200 | 85 | 3-6 | 0.7 | 257-8 | 0.71 |
| 6 | 230 | 88 | 0-2 | 0.1 | 256-7 | 0.66 |
| 7* | 100 | 85 | 10 | 4.0 | 255-6 | 0.64 |
| 8 | 300 | 83 | 25 | 0.1 | 255-6 | 0.69 |

Runs 3 and 7 are carried out employing 0.01 wt. percent of 98% sulfuric acid as catalyst. At all temperatures, satisfactory polymer is obtained but the results of Run 1 indicate that reaction times required may well be excessive while, in Run 8, time is so short as to make control somewhat difficult. Moreover, the polymer produced in Run 8 is somewhat darker than those of the other runs.

EXAMPLE X

A batch is prepared by adding to water an ester mixture consisting essentially of bis-(beta-acetoxyethyl) terephthalate and mono-(beta-acetoxyethyl) terephthalate. The amouns of water and ester components corresponding to 713 mols, 12.9 mols and 7 mols, respectively. The ester mixture used in this example is prepared by reaction between terephthalic acid and ethylene glycol diacetate and has been distilled to separate the monomers from oligomers formed in the reaction. This batch is charged to an autoclave equipped with heating coils and a turbine-type agitator. The autoclave is then pressure with nitrogen and heated to 140° C., the reactor pressure after heating being 200 p.s.i.g. After 3.5 hours, about 92% of the acetate moieties have been liberated as acetic acid and the reaction is then quenched by adding cold water to the autoclave to cool its contents to approximately 100° C.

The autoclave is depressured and the contents stripped and then polymerized as described in Example I. This procedure results in the formation of polyethylene terephthalate having the appearance, melting point, and intrinsic viscosity of the product described in Example I. Substantially similar polymer quality is obtained when the procedure is repeated except that acetic acid and water are not removed prior to polymerization but are removed concurrently with ethylene glycol and ethylene glycol mono-acetate during polymerization.

EXAMPLE XI

Example X is repeated except that a smaller amount of water, i.e. a water to acetate moiety ratio of 16.7 is employed and the hydrolysis is terminated after 86.5% of the acetate moieties have been liberated as acetic acid. A polyethylene terephthalate substantially identical with the polymer obtained by the procedure of Example X is recovered.

EXAMPLE XII

An ester feed consisting of mono-(beta-acetoxyethyl) terephthalate is substituted for the diester-oligomer feed of Example I, and is hydrolyzed as described in Example I with a water to ester mol ratio of 15/1. After a reaction time of 1 hour, 92% of the acetate moieties have been liberated as acetic acid. The product is polymerized as in Example I except that 0.3 mol of ethylene glycol per mol of original ester is added after removal of water and acetic acid. A porduct substantially the same as the product of Example I is obtained.

EXAMPLE XIII

Example XII is repeated except that use is made of an ester feed consisting of 80 mol percent mono-(beta-acetoxyethyl) terephthalate and 20 mol percent bis-(beta-acetoxyethyl) terephthalate, and 18 mols of water are used per mol of ester. After 1 hour, 93% of the acetate moieties are liberated as acetic acid.

After removal of water and acetic acid and prior to polymerization 0.1 mol of ethylene glycol/mol of original ester is added. A product substantially the same as the product of Example I is obtained.

The embodiments of the invention in which an exclusive property is claimed are defined as follows:

1. A process for the preparation of polyethylene terephthalate from a diester consisting essentially of a bis-(beta-acyloxyethyl) terephthalate the acyl group of which has 1 to 4 carbon atoms and its oligomers, said process comprising the steps of:
   (a) forming a mixture of the diester with water, the water being present in an amount sufficient to provide at least 0.25 mol thereof per equivalent of acyl groups in the diester feed;
   (b) reacting the mixture until from about 25% to about 100% of the acyl moieties contained in the diester feed are liberated as the corresponding lower carboxylic acid thereby forming a hydrolyzate containing bis-(beta-hydroxyethyl) terephthalate together with the acid;
   (c) polymerizing the bis-(beta-hydroxyethyl) terephthalate to form a polyethylene terephthalate resin.

2. A process in accordance with claim 1 wherein the bis-(beta-acyloxyethyl) terephthalate is bis-(beta-acetoxyethyl terephthalate.

3. A process in accordance with claim 1 wherein at least 0.35 mol of water is employed in the mixture per equivalent of acyl groups in the diester feed.

4. A process in accordance with claim 1 wherein the temperature employed in the reaction of the admixture is between about 100° C. and about 275° C.

5. A process in accordance with claim 1 wherein the lower carboxylic acid formed during the reaction of said mixture and excess water present after reaction are removed from the hydrolyzate and the balance of the hydrolyzate, containing the bis-(beta-hydroxyethyl ) terephthalate, is then polymerized.

6. A process in accordance with claim 1 wherein the amount of oligomers in the diester feed is less than about 50%.

7. A process for the preparation of polyethylene terephthalate from a diester consisting essentially of a bis-(beta-acyloxyethyl) terephthalate, the acyl groups of which have 1 to 4 carbon atoms, and its oligomers, said process comprising the steps of:
   (a) forming a mixture of the diester with water, the water being present in an amount sufficient to provide at least 0.25 mol thereof per equivalent of acyl groups in the diester feed;
   (b) reacting the mixture in the liquid phase at a temperature between about 100° C. and about 275° C. until from about 25% to about 100% of the acyl moieties contained in the diester feed are liberated as the corresponding lower carboxylic acid, thereby forming a hydrolyzate containing bis-(beta-hydroxyethyl) terephthalate;
   (c) removing the lower carboxylic acid and unreacted water from the hydrolyzate, and
   (d) polymerizing the balance of the hydrolyzate to form a polyethylene terephthalate resin.

8. A process in accordance with claim 7 wherein the bis-(beta-acyloxyethyl) terephthalate is bis-(beta-acetoxyethyl) terephthalate.

9. A process in accordance with claim 7 wherein the amount of oligomers in the diester feed is less than about 50%.

10. A process for the preparation of polyethylene terephthalate from an ester feed consisting essentially of a bis-(beta-acyloxyethyl) terephthalate the acyl group of which has 1 to 4 carbon atoms, or a mixture of said diester with up to about 70 mol percent of the corresponding mono-(beta-acyloxyethyl) terephthalate, said process comprising the steps of:
   (a) forming a mixture of the ester feed with water, the water being present in an amount sufficient to provide at least 0.25 mol thereof per equivalent of acyl groups in the ester feed;
   (b) reacting the mixture until from about 25% to about 100% of the acyl moieties contained in the ester feed are liberated as the corresponding lower carboxylic acid thereby forming a hydrolyzate containing bis-(beta-hyroxyethyl) terephthalate or a mixture of mono- and bis-(beta-hydroxyethyl) terephthalates together with the acid;
   (c) polymerizing the bis-(beta-hydroxyethyl) terephthalate or the terephthalate mixture to form a polyethylene terephthalate resin.

11. A process in accordance with claim 10 wherein the bis-(beta-acyloxyethyl) terephthalate is bis-(beta-acetoxyethyl) terephthalate.

12. A process in accordance with claim 10 wherein at least 0.35 mol of water is employed in the mixture per equivalent of acyl groups in the ester feed.

13. A process in accordance with claim 10 wherein the temperature employed in the reaction of the admixture is between about 100° C. and about 275° C.

14. A process in accordance with claim 10 wherein the lower carboxylic acid formed during the reaction of said mixture and excess water present after reaction are removed from the hydrolyzate and the balance of the hydrolyzate containing the bis-(beta-hydroxyethyl) terephthalate, is then polymerized.

15. A process in accordance with claim 10 wherein the ester feed is a mixture of bis-(beta-acyloxyethyl) terephthalate and mono-(beta-acyloxyethyl) terephthalate.

16. A process in accordance with claim 15 wherein the ester feed includes oligomers of the ester.

17. A process in accordance with claim 16 wherein the amount of oligomers in the ester feed is less than about 50%.

18. A process in accordance with claim 10 wherein the ester feed includes oligomers of the ester.

19. A process in accordance with claim 18 wherein the amount of oligomers in the ester feed is less than about 50%.

20. A process for the preparation of polyethylene terephthalate from an ester feed consisting essentially of a bis-(beta-acyloxyethyl) terephthalate, the acyl groups of which have 1 to 4 carbon atoms, or of a mixture of said diester with up to about 70 mol percent of the corresponding mono-(beta-acyloxyethyl) terephthalate, said process comprising the steps of:
   (a) forming a mixture of the ester feed with water, the water being present in an amount sufficient to provide at least 0.25 mol thereof per equivalent of acyl groups in the ester feed;
   (b) reacting the mixture in the liquid phase at a temperature between about 100° C. and about 275° C. until from about 25% to about 100% of the acyl moieties contained in the ester feed are liberated as the corresponding lower carboxylic acid, thereby forming a hydrolyzate containing bis-(beta-hydroxyethyl) terephthalate;
   (c) removing the lower carboxylic acid and unreacted water from the hydrolyzate, and (d) polymerizing the balance of the hydrolyzate to form a polyethylene terephthalate resin.

21. A process in accordance with claim 20 wherein the bis-(beta-acyloxyethyl) terephthalate is bis-(beta-acetoxyethyl) terephthalate.

22. A process in accordance with claim 20 wherein the ester feed includes oligomers of the ester.

23. A process in accordance with claim 22 wherein the amount of oligomers in the ester feed is less than about 50%.

24. A process for the preparation of a polyethylene terephthalate from an ester feed consisting essentially of a mono-(beta-acyloxyethyl) terephthalate the acyl group of which has 1 to 4 carbon atoms, or a mixture of said monoester with up to 30 mol percent of the corresponding bis-(beta-acyloxyethyl) terephthalate, said process comprising the steps of:
  (a) forming a mixture of the ester feed with water, the water being present in an amount sufficient to provide at least 0.25 mol thereof per equivalent of acyl groups in the ester feed;
  (b) reacting the mixture until from about 25% to about 100% of the acyl moieties contained in the ester feed are liberated as the corresponding lower carboxylic acid thereby forming a hydrolyzate containing mono-(beta-hydroxyethyl) terephthalate or a mixture of mono- and bis-(beta-hydroxyethyl) terephthalates together with the acid; and
  (c) polymerizing the bis-(beta-hydroxyethyl) terephthalate or the terephthalate mixture in the presence of ethylene glycol in an amount to provide at least 1.1 mols of ethylene glycol moieties per mol of equivalent terephthalic acid contained in said hydrolyzate to form a polyethylene terephthalate resin.

25. A process in accordance with claim 24 wherein the mono-(beta-acyloxyethyl) terephthalate is mono-(beta-actoxyethyl) terephthalate.

26. A process in accordance with claim 24 wherein the ester feed includes oligomers of the ester.

27. A process in accordance with claim 24 wherein at least 0.35 mol of water is employed in the mixture per equivalent of acyl groups in the ester feed.

28. A process in accordance with claim 24 wherein the temperature employed in the reaction is between about 100° C. and about 275° C.

29. A process in accordance with claim 24 wherein the lower carboxylic acid formed during the reaction of said mixture and excess water present after reaction are removed from the hydrolyzate and the balance of the hydrolyzate, containing the (beta-hydroxyethyl) terephthalate derived from the (beta-acyloxyethyl) terephthalate in the ester feed is then polymerized .

30. A process in accordance with claim 24 wherein the ester feed is a mixture of bis-(beta-acyloxyethyl) terephthalate and mono-(beta-acyloxyethyl) terephthalate.

31. A process in accordance with claim 30 wherein the ester feed includes oligomers of the ester.

32. A process in accordance with claim 31 wherein the amount of oligomers in the ester feed is less than about 50%.

References Cited
FOREIGN PATENTS 760,125    11/1956    Great Britain.
1,960,006    8/1970    Germany.

MELVIN GOLDSTEIN, Primary Examiner

U.S. Cl. X.R.

260—75 M, 475 P